(12) United States Patent
Spellman

(10) Patent No.: US 6,492,807 B2
(45) Date of Patent: Dec. 10, 2002

(54) ABSOLUTE ANGLE SENSOR FOR MULTI-TURN SHAFT

(75) Inventor: Charles Albert Spellman, Auburn, IN (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/778,344

(22) Filed: Feb. 6, 2001

(65) Prior Publication Data

US 2002/0105321 A1 Aug. 8, 2002

(51) Int. Cl.[7] .............................. G01B 7/30; H01C 10/32
(52) U.S. Cl. .......................... 324/207.22; 324/207.2; 324/207.25; 324/207.21; 180/400; 338/162
(58) Field of Search ..................... 324/207.21–207.25, 324/207.2; 74/640, 388; 338/162; 180/400

(56) References Cited

U.S. PATENT DOCUMENTS

| | | | | |
|---|---|---|---|---|
| 2,906,143 A | * | 9/1959 | Musser ........................ | 74/640 |
| 4,736,660 A | * | 4/1988 | Benach et al. ............... | 83/174 |
| 4,812,803 A | * | 3/1989 | Hochholzer .................. | 338/175 |
| 4,920,939 A | * | 5/1990 | Gale ............................. | 123/399 |
| 4,924,781 A | * | 5/1990 | Span ............................ | 108/22 |
| 5,370,011 A | * | 12/1994 | Gilges et al. ................. | 74/89 |
| 5,432,416 A | * | 7/1995 | Tae-Sig ........................ | 318/568.12 |
| 6,124,709 A | * | 9/2000 | Allwine ....................... | 324/207.2 |
| 6,220,104 B1 | * | 4/2001 | Yoshino et al. ............. | 73/862.08 |
| 6,326,781 B1 | * | 12/2001 | Kunde et al. ................ | 324/207.21 |

\* cited by examiner

*Primary Examiner*—Edward Lefkowitz
*Assistant Examiner*—Darrell Kinder

(57) ABSTRACT

A system for determining the absolute position of a multi-turn shaft is disclosed. The shaft is mounted in an elliptically shaped wave generator. The wave generator is coupled to a flex spline which is deformed to match the wave generator. The exterior surface of the flex spline has a number of gear teeth. The flex spline is installed within a cylindrical, circular spline. The circular spline has an interior diameter which is slightly larger than the largest diameter of the flex spline. The interior surface of the circular spline has a number of teeth which interlock with the teeth of the flex spline. In such a manner, the rotation of the shaft will cause an angular displacement of the circular spline. A position sensor is located on the circular spline and serves to track the position of the circular spline which is proportional to the absolute position of the shaft.

16 Claims, 3 Drawing Sheets

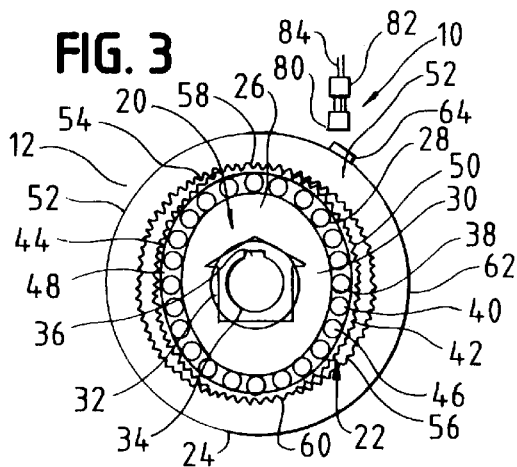
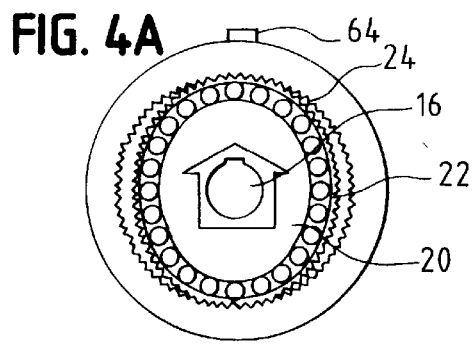
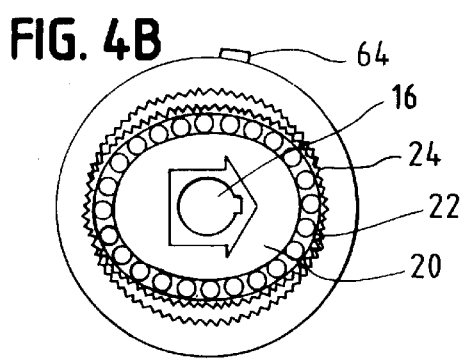
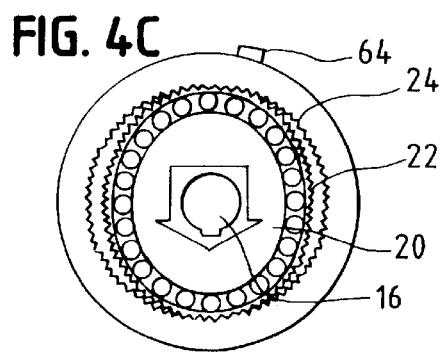

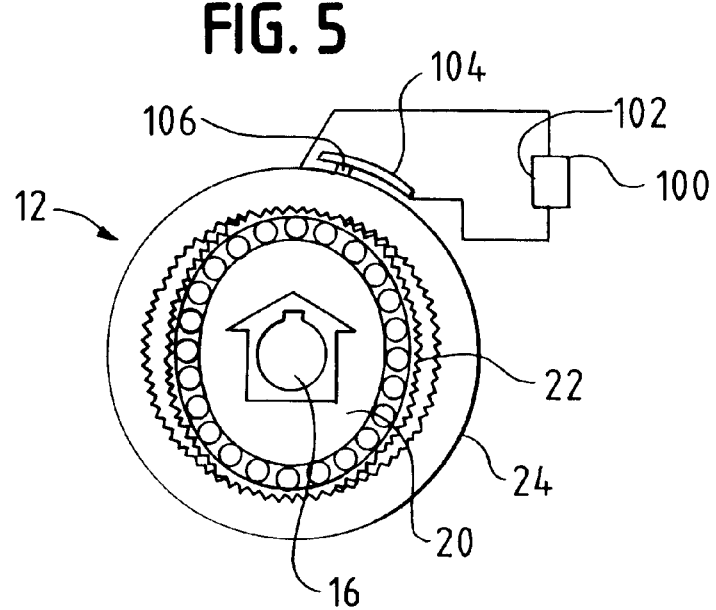
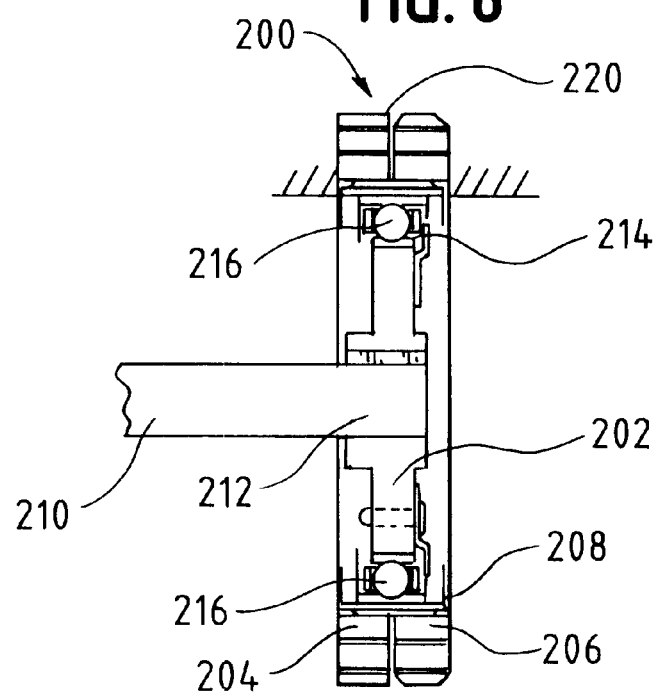

ABSOLUTE ANGLE SENSOR FOR MULTI-TURN SHAFT

FIELD OF INVENTION

This invention relates to a sensor to determine the rotational angle of a multi-turn shaft. More specifically, this invention relates to an angular sensor that determines the absolute position of a multi-turn shaft.

BACKGROUND

In the automotive and other fields, rotational control devices such as steering wheels may turn several times in order to enable a full range of operation. In the case of a steering wheel for example, the wheel is turned three times for the full range of turning the front wheels of a car. The angular position of the steering wheel must be measured and additionally the number of turns completed must also be determined in order to determine the real position of the front wheels.

In order to determine angular position, a potentiometer is attached to a circular resistor located around the shaft and a wiper contact is attached to one point on the circumference of the shaft. The resistance changes with the movement of the wiper contact and thus the voltage measured by the potentiometer changes as the shaft is rotated, providing a determination of the angle of the shaft. Additional circuitry is required to record the precise position of the shaft by staring the number of rotations in order to obtain the true position of the front wheels. Such circuitry unnecessarily complicates the sensor system.

Some present systems use mechanical solutions to magnify the effect of the angle of the shaft rotation. Such mechanical configurations include a relatively complex helical or spur gear system. Thus, the single rotation cycle of the shaft will translate in smaller increments of movements via the helical or spur gear. Unfortunately, the use of helical or spur gears adds to the complexity and expense of the steering assembly. Additionally, with increasing numbers of gears, mechanical backlash becomes problematic.

Thus, there exists a need for a simple absolute position sensor for a multi-turn shaft assembly. There is also a further need for an absolute position sensor that may determine the angular position of a shaft assembly without the use of processing circuitry to determine the number of turns of a shaft. Also, there exists a need for a position sensor that may be used in conjunction with an in-line, concentric assembly of a multi-turn shaft. Finally, there exists a need for a position sensor that may be used in conjunction with a gearing assembly that eliminates gear backlash.

SUMMARY OF THE INVENTION

The present invention may be embodied in an angular position sensor system for determining the absolute position of a rotating member. The sensor system has a drive assembly coupled to the rotating member. The drive assembly includes a wave generator having an elliptical shape. A flex spline is coupled to the wave generator. The flex spline has an exterior surface with teeth. A cylindrical spline has a diameter larger than the largest diameter of the flex spline and an interior surface with teeth which interlock with the teeth of the flex spline. The cylindrical spline rotates at a proportional angle of rotation when the rotating member is rotated a full revolution. A position sensor is operatively coupled to the drive assembly and outputs the angular absolute position of the rotating member.

The present invention may also be embodied in an angular position sensor system for determining the absolute position of a rotating shaft. The sensor system has a drive assembly coupled to the shaft. The drive assembly has a wave generator having an elliptical shape coupled to the shaft. A flex spline is coupled to the wave generator. The flex spline has an exterior surface with teeth. A cylindrical spline has a diameter larger than the largest diameter of the flex spline and an interior surface with teeth which interlock with the teeth of the flex spline. The cylindrical spline rotates at a proportional angle of rotation when the shaft is rotated a full revolution. A position sensor is operatively coupled to the cylindrical spline and outputs the angular absolute position of the shaft.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 3 is a side cutaway view of the rotational position sensor and harmonic drive assembly of FIG. 1.

FIGS. 4A–C are side cutaway views of the harmonic drive shown in FIG. 1 in various angles of rotation of the shaft.

FIG. 5 is a side view of an alternate embodiment of a position sensor for a multi-turn shaft.

FIG. 6 is a side view of an alternate embodiment of a harmonic drive assembly which incorporates a position sensor according to the present invention.

DESCRIPTION OF THE PREFERRED EMBODIMENT

Figure 1:
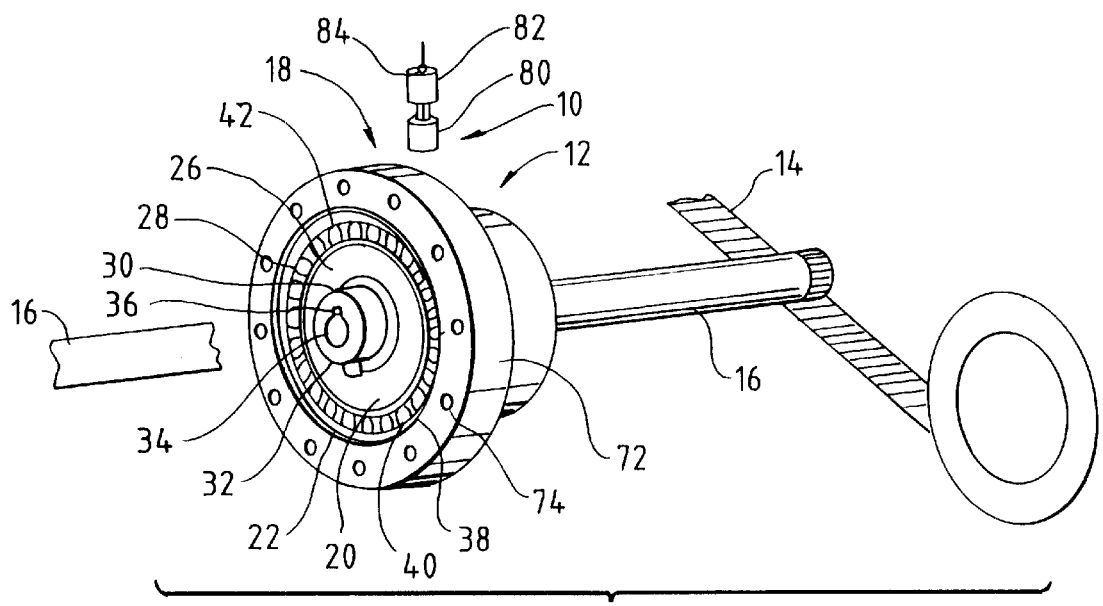
FIG. 1 is a perspective view of a rotational position sensor in conjunction with a harmonic drive assembly according to one embodiment of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
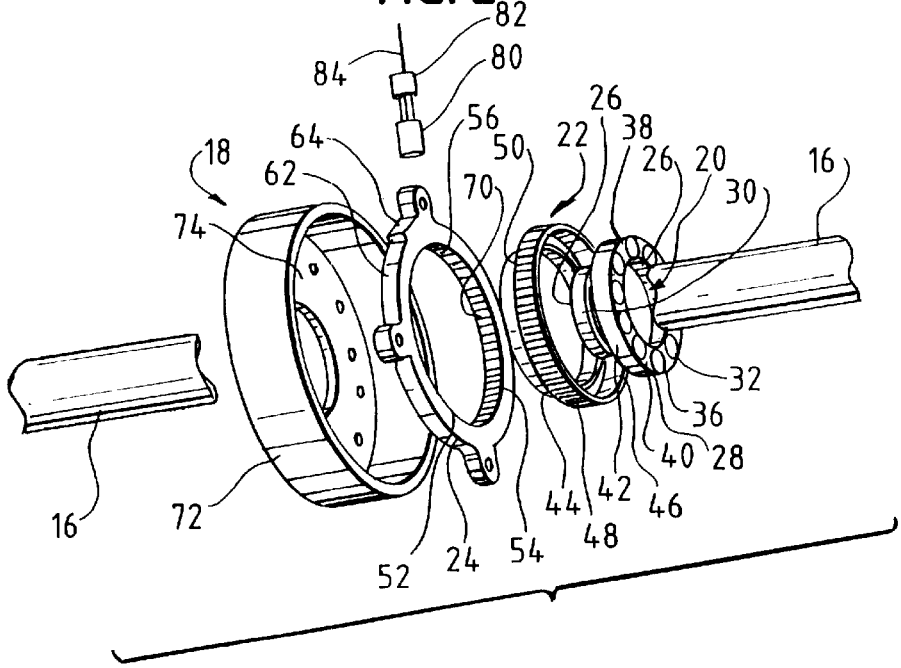
FIG. 2 is an exploded view of the rotational position sensor and harmonic drive assembly of FIG. 1.

The drawings and more particularly FIGS. 1–3 show a perspective view, an exploded perspective view and a side view of an absolute angle position sensor generally indicated at 10, embodying the general principles of the present invention. The sensor 10 is mounted on a rotating member assembly such as a multi-turn shaft assembly 12. The shaft assembly 12 is coupled to a mechanical pinion system 14 which is moved by rotating a shaft 16. The pinion system 14 such as the front wheels of an automobile is moved in relative motion by rotating the shaft 16 several times. The absolute angle of the rotation of the shaft 16 determines the precise position of the pinion system 14 within a smaller range of motion. In this example the shaft 16 may be rotated approximately 1300 degrees (approximately three and half full rotations) in order to achieve the limited range of movement of the pinion system 14.

The shaft assembly 12 has a harmonic drive type assembly 18 which is located on the shaft 16 and facilitates measurement of the absolute angular position of the pinion system 14 in relation to the steering assembly. The harmonic drive assembly 18 has a wave generator 20, a flex spline 22 and a circular spline 24. The wave generator 20 has an elliptical cam 26 which is enclosed in an anti-friction, ball bearing assembly 28. The elliptical cam 26 has a back surface 30 which has a cylindrical socket hub 32. The socket hub 32 has a socket 34 which has a slot 36 to insure that the shaft 16 is locked into the elliptical cam 26 and moves rotationally with the elliptical cam 26.

The ball bearing assembly 28 is elliptically shaped with an annular groove 38 which holds a number of ball bearings 40. The ball bearings 40 are lubricated in order facilitate the rotational movement of the wave generator 20. The ball bearing assembly 28 has an exterior surface 42 which is mated with the flex spline 22.

The flex spline 22 has a flexible, circular cup 44. The circular cup 44 has an interior surface 46 which is the same shape as the exterior surface 42 of the wave generator 20 creating a locking fit between the wave generator 20 and the flex spline 22. The circular cup 44 also has an exterior surface 48 which has a series of annular spline teeth 50.

The greatest diameter of the circular cup 44 is slightly smaller than the circumference of the circular spline 24. The circular spline 24 has a thick-walled, rigid ring 52 having an interior surface 54. The interior surface 54 of the rigid ring 52 is circular in shape and has a series of internal spline teeth 56. At two ends 58 and 60 of the greatest diameter of the circular cup 44 the annular spline teeth 50 of the flex spline 22 interlock with the internal spline teeth 56 of the ring 52. The circular spline 24 also has an exterior surface 62 which has a magnet 64 which as will be explained below is used to determine the absolute angular position of the circular spline 24.

The flex spline 22 has a number of lock points 70 which are located on its circumference. The flex spline 22 is connected to a protective cover 72 which has a number of mounting holes 74. Screws or bolts (not shown) connect the protective cover 72 to the lock points 70 of the flex spline 22. The protective cover 72 is mechanically coupled to a fixed, non-rotating reference point such as a steering column to fix the drive assembly 18 in place.

The harmonic drive assembly 18 is coupled to the shaft 16. The interaction between the wave generator 20, flex spline 22 and the circular spline 24 reduce the rotation of the shaft from 1300 degrees of travel of the wave generator to 20 to 30 degrees of travel for the circular spline 24. The travel of the circular spline 24 is proportional to the movement of the pinion assembly 14 from the shaft 16. In other words, turning the shaft 16 approximately three and a half times will rotate the circular spline 24 and the pinion assembly 14 approximately 30 degrees. Since the magnet 64 is located on the circular spline 24 rather than the shaft 16, the absolute angular position of the spline 24 may be determined via the sensor 10. In this case, the shaft 16 is coupled to a steering wheel while the pinion assembly 14 rotates the front wheels of a vehicle.

As shown in FIGS. 4A–4C, the rotation of the circular spline 24 is reduced to a small angle via the gearing arrangement between the wave generator 20, flex spline 22 and the circular spline 24. FIG. 4A shows the wave generator 20 in a first position relative to the circular spline 24. As the shaft 16 is rotated, the annular spline teeth 50 at the elliptical diameter of the flex spline 22 interlock with the corresponding interior teeth 56 of the circular spline 24. As the shaft 16 and the flex spline 22 is rotated as shown in FIG. 4B, the circular spline 24 is rotated proportionally. The rotation of the shaft 16 at 180 degrees as shown in FIG. 4C causes the circular spline 24 to be rotated by one gear tooth on the circular spline 24 or approximately 4.1 degrees. If the shaft 16 is rotated a full 360 degrees, the circular spline 24 will be rotated by two gear teeth or approximately 8.2 degrees. It is to be understood that the gearing ratio may be adjusted by adjusting the number of gear teeth in the flex spline 22 and the circular spline 24.

Returning to FIGS. 1–3, the magnet 64 moves with the circular spline 24. Measurement of the angle of the magnetic field of the magnet 64 will determine the absolute angular position of the circular spline 24. The sensor 10 measures the angle of the magnetic field and includes a magnetic field transducer unit 80. The magnetic field transducer unit 80 is coupled to a processing unit 82 which reads the magnetic field output from the transducer unit 80. The detector 80 may be any appropriate magnetic field detector such as magneto-resistance, GMR, Hall effect or other type of magnetic field sensor. The processing unit 82 has an output interface 84 which may be coupled to further processing electronics such as a chassis computer for the purpose of vehicle stability control in this example.

The transducer unit 80 in this embodiment is a transducer integrated circuit such as a KMZ43 magnetic field sensor manufactured by Philips Electronics. The transducer unit 80 outputs an electronic signal responsive to the detected magnetic field direction from the magnet 64 in FIGS. 1–3. However any appropriate magnetic field sensor may be used. The transducer unit 80 has a pair of magnetic field transducers which are magneto-resistive elements in this example and detect the direction of the magnetic field generated by magnet 22.

As will be explained below, the transducer unit 80 outputs a pair of varying sinusoidal signals from the magnetic field transducers which are representative of the angle direction of the detected magnetic field from the magnet 64. The signal processor unit 82 reads the sinusoidal signals output from the transducer unit 80 and converts them into a digital linear output. The signal processor unit 82 in the preferred embodiment is a UZZ9000 sensor conditioning electronic unit manufactured by Philips Electronics. However, any appropriate hardware or software configuration may be used to process the raw signals from the transducer unit 80 to output a linear signal. The signal processor unit 82 calculates the arctangent of the angle based on the sine and cosine of the magnetic field direction determined from the sensing elements of the transducer unit 80 which measure the magnetic field angle of the magnet 64 and thus the angular position of the circular spline 24.

Alternatively, the shaft 16 could be coupled to the circular spline 24 causing the wave generator 20 to turn at a reduced gearing ratio. In such a configuration, the positions sensor would be installed on the wave generator 20. It is to be understood that any application which requires determination of the absolute position of a rotating member may use the principles explained above.

Also, any reduction gearing applications may use the principles illustrated above. The harmonic drive assembly 18 provides input and output gears in the form of the wave generator 20, flex spline 22 and circular spline 24 which are concentric thus eliminating the need for more complex gearing in reduction gearing application. The spline teeth 50 and 56 are precisely machined and due to the interference between them, backlash is negligible. Additionally, the multiple tooth engagement between the flex spline 22 and the circular spline 24 allows high output torque to be achieved with negligible backlash.

The harmonic drive assembly 18 may be configured to fix the wave generator 20, the flex spline 22 or the circular spline 24. The other two components are coupled to rotating members and are used to cause the rotation reduction. In such configurations, the position sensor components would be located on the component which has the reduced rotation. For example, if the wave generator 20 were fixed to a non-rotating base, gear reduction could be achieved from a rotating member coupled to the flex spline 22 to reduce rotation of the circular spline 24. The absolute angle position sensor in such a configuration would be located on the circular spline 24. Alternatively, gear reduction could be achieved from a rotating member coupled to the circular spline 24 to reduce rotation of the flex spline 22. The absolute angle position sensor in such a configuration would be located on the flex spline 22.

If the circular spline 24 were fixed to a non-rotating base, gear reduction could be achieved from a rotating member coupled the flex spline 22 to reduce rotation of the wave generator 20. The absolute angle position sensor in such a configuration would be located on the wave generator 20. Alternatively, gear reduction could be achieved from a rotating member coupled to the wave generator 20 to reduce rotation of the flex spline 22. The absolute angle position sensor in such a configuration would be located on the flex spline 22.

FIG. 5 shows a second type of position sensor 100 which may be used in conjunction with the multi-shaft assembly 12 in FIG. 1. Like elements to the multi-shaft assembly 12 in FIG. 1 are labeled identically in FIG. 5. The position sensor 100 has a potentiometer 102 which is coupled to an arcuate resistor 104. The arcuate resistor 104 is located on the outer surface of the circular spline 24. One lead of the potentiometer 102 is coupled to one end of the resistor 104. The other lead of the potentiometer 102 is coupled to the circular spline 24. A wiper electrical contact 106 is located on the outer surface of the circular spline 24 to create electrical contract between the circular spline 24 and the face of the resistor 104 to complete the circuit.

The resistor 104 is of a sufficient arcuate length to provide continuous contact with the wiper electrical contact 106 through the course of rotating the shaft 16. As the shaft 16 rotates, a smaller degree of rotation of the circular spline 24 occurs. The rotation of the circular spline 24 moves the wiper electrical contract 106 along the resistor 104 thus changing the voltage measured by the potentiometer 102. The voltage measured by the potentiometer is therefore proportional to the angular position of the circular spline 24. By providing a longer resistor, any range of angular movement between 1 and 360 degrees may be determined based on the rotation of the multi-turn shaft.

A cross sectional side view of a second type of harmonic drive assembly 200 is shown in FIG. 6. The drive assembly 200 has a wave generator 202, a rotating circular spline 204, a fixed circular spline 206 and a flexible spline 208. A shaft 210 is attached to the wave generator 202 via a socket 212. The rotation of the shaft 210 thus rotates the wave generator 202 and the flexible spline 208.

The wave generator 202 has an annular slot 214 which has ball bearings 216 to facilitate the rotation of the wave generator 202. The wave generator 202 is elliptical in shape with a diameter which is just smaller than the diameter of the rotating circular spline 204 and the fixed circular spline 206. The exterior surface of the flex spline 208 has a number of teeth which interlock with teeth which are located on the interior surface of the rotating circular spline 204. Similarly to the assembly explained above, the rotation of the shaft 210 causes the wave generator 202 to rotate thus causing the teeth of the flex spline 208 to move around the interior teeth of the rotating circular spline 204. The rotating circular spline 204 moves in proportion to the number of turns applied to the shaft 210. The fixed circular spline 206 forces the flex spline 208 to rotate as their respective teeth are meshed. The rotation of the flex spline 208 is then coupled to the rotating circular spline 204.

This system functions identically to the previous system except the flex spline 208 is coupled to a rotating member and rotates as a unit. In the system described in FIGS. 1–3, either the wave generator 20 or the circular spline 24 may be constrained from movement to provide a fixed reference point instead of the flex spline 24. However, this arrangement results in a relatively long axial profile. The drive assembly 200 results in a more compact axial profile.

A magnet 220 is mounted on the exterior surface of the rotating circular spline 204. The magnetic field emitted by the magnet 220 may be measured to determine the angular position of the rotating circular spline 204. Of course other types of position sensors may be used to determine the angular position of the rotating circular spline 204.

Of course, the present invention may be employed in any application which requires determination of angular position of a shaft or reduction gearing using harmonic drive assemblies. Examples in the automotive field include throttle position sensors, gas and brake pedal position sensors, suspension position sensors and window position sensors. The present invention may also be used in similar fields such as a throttle grip position sensor on a motorcycle.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. An angular position sensor system for determining the absolute position of a rotating member, the sensor system comprising:
    a drive assembly coupled to the rotating member, the drive assembly including:
    a wave generator having an elliptical shape coupled to the rotating member;
    a flex spline coupled to the wave generator, the flex spline having an exterior surface with teeth;
    a circular spline having a diameter larger than the largest diameter of the flex spline and an interior surface with teeth which interlock with the teeth of the flex spline, wherein the circular spline rotates at a proportional angle of rotation when the rotating member is rotated a full revolution; and
    a position sensor operatively coupled to the drive assembly which senses the angular position of the circular spline and which outputs the angular absolute position of the rotating member as a function of the angular position of the circular spline.

2. The system of claim 1 wherein the position sensor further includes a magnet mounted on the drive assembly and a magnetic field transducer which measures the magnetic field from the magnet as a function of the absolute position of the rotating member.

3. The system of claim 2 wherein the flex spline is coupled to a fixed non-rotating base, and the magnet is located on the circular spline.

4. The system of claim 3 wherein the rotating member is a shaft which extends through the drive assembly.

5. The system of claim 1 wherein the position sensor further includes a contact wiper, an arcuate resistor in electrical contact with the contact wiper, and a potentiometer coupled to the resistor and the wiper contact, the voltage on the resistor being a function of the absolute position of the rotating member.

6. The system of claim 1 wherein the wave generator has an elliptical groove having ball bearings.

7. The system of claim 1 further comprising a fixed non-rotating base coupled to the flexible spline.

8. An angular position sensor system for determining the absolute position of a rotating shaft, the sensor system comprising:
  a drive assembly coupled to the shaft, the drive assembly including:
  a wave generator having an elliptical shape coupled to the shaft;
  a flex spline coupled to the wave generator, the flex spline having an exterior surface with teeth;
  a circular spline having a diameter larger than the largest diameter of the flex spline and an interior surface with teeth which interlock with the teeth of the flex spline, wherein the circular spline rotates at a proportional angle of rotation when the shaft is rotated a full revolution; and
  a position sensor operatively coupled to the circular spline which senses the angular position of the circular spline outputs the angular absolute position of the shaft as a function of the angular position of the circular spline.

9. The system of claim 8 wherein the position sensor further includes a magnet mounted on the circular spline, a magnetic field transducer which measures the magnetic field from the magnet as a function of the absolute position of the shaft.

10. The system of claim 8 wherein the position sensor further includes a contact wiper, an arcuate resistor coupled to the circular spline and in electrical contact with the contact wiper, and a potentiometer coupled to the resistor and the wiper contact, the voltage on the resistor being a function of the absolute position of the shaft.

11. The system of claim 8 wherein the wave generator has an elliptical groove having ball bearings.

12. An angular position sensor system for determining the absolute position of a rotating member, the sensor system comprising:
  a drive assembly including:
  a wave generator having an elliptical shape;
  a flex spline coupled to the wave generator and a fixed non-rotating base, the flex spline having an exterior surface with teeth;
  a circular spline having a diameter larger than the largest diameter of the flex spline and an interior surface with teeth which interlock with the teeth of the flex spline and wherein the circular spline is coupled to the rotating member;
  wherein the wave generator rotates at a proportional angle of rotation when the circular spline is rotated a full revolution; and
  a position sensor operatively coupled to the drive assembly which senses the angular position of the wave generator and which outputs the angular absolute position of the rotating member as a function of the angular position of the wave generator.

13. An angular position sensor system for determining the absolute position of a rotating member, the sensor system comprising:
  a drive assembly including:
  a wave generator having an elliptical shape;
  a flex spline coupled to the wave generator and the rotating member, the flex spline having an exterior surface with teeth;
  a circular spline having a diameter larger than the largest diameter of the flex spline and an interior surface with teeth which interlock with the teeth of the flex spline and wherein the circular spline is coupled to a fixed non-rotating base;
  wherein the wave generator rotates at a proportional angle of rotation when the rotating member is rotated a full revolution; and
  a position sensor operatively coupled to the drive assembly which senses the angular position of the wave generator and which outputs the angular absolute position of the rotating member as a function of the angular position of the wave generator.

14. An angular position sensor system for determining the absolute position of a rotating member, the sensor system comprising:
  a drive assembly including:
  a wave generator having an elliptical shape and coupled to the rotating member;
  a flex spline coupled to the wave generator, the flex spline having an exterior surface with teeth;
  a circular spline having a diameter larger than the largest diameter of the flex spline and an interior surface with teeth which interlock with the teeth of the flex spline and wherein the circular spline is coupled to a fixed non-rotating base;
  wherein the flex spline rotates at a proportional angle of rotation when the rotating member is rotated a full revolution; and
  a position sensor operatively coupled to the drive assembly which senses the angular position of the flex spline and which outputs the angular absolute position of the rotating member as a function of the angular position of the flex spline.

15. An angular position sensor system for determining the absolute position of a rotating member, the sensor system comprising:
  a drive assembly including:
  a wave generator having an elliptical shape and coupled to a fixed non-rotating base;
  a flex spline coupled to the wave generator, the flex spline having an exterior surface with teeth and coupled to the rotating member;
  a circular spline having a diameter larger than the largest diameter of the flex spline and an interior surface with teeth which interlock with the teeth of the flex spline; and
  wherein the circular spline rotates at a proportional angle of rotation when the rotating member is rotated a full revolution; and
  a position sensor operatively coupled to the drive assembly which senses the angular position of the circular spline and which outputs the angular absolute position of the rotating member as a function of the angular position of the circular spline.

16. An angular position sensor system for determining the absolute position of a rotating member, the sensor system comprising:

a drive assembly including:

a wave generator having an elliptical shape and coupled to a fixed non-rotating base;

a flex spline coupled to the wave generator, the flex spline having an exterior surface with teeth;

a circular spline coupled to the rotating member and having a diameter larger than the largest diameter of the flex spline and an interior surface with teeth which interlock with the teeth of the flex spline; and wherein the flex spline rotates at a proportional angle of rotation when the rotating member is rotated a full revolution; and a position sensor operatively coupled to the drive assembly which senses the angular position of the flex spline and which outputs the angular absolute position of the rotating member as a function of the angular position of the flex spline.

* * * * *